(12) United States Patent
Ku

(10) Patent No.: US 8,671,505 B2
(45) Date of Patent: Mar. 18, 2014

(54) WINDSHIELD WIPER BLADE ASSEMBLY

(75) Inventor: Yuan-Chin Ku, New Taipei (TW)

(73) Assignee: Dongguan Hongyi Wiper Co., Ltd, Guang Dong (CN)

( * ) Notice: Subject to any disclaimer, the term of this patent is extended or adjusted under 35 U.S.C. 154(b) by 310 days.

(21) Appl. No.: 13/051,094

(22) Filed: Mar. 18, 2011

(65) Prior Publication Data

US 2012/0180246 A1   Jul. 19, 2012

(30) Foreign Application Priority Data

Jan. 14, 2011   (CN) .......................... 2011 1 0007240

(51) Int. Cl.
*B60S 1/38*   (2006.01)

(52) U.S. Cl.
USPC ..................................... 15/250.46; 15/250.44

(58) Field of Classification Search
USPC ........... 15/250.46, 250.44, 250.451–250.454, 15/250.31, 250.361, 250.201
See application file for complete search history.

(56) References Cited

U.S. PATENT DOCUMENTS

| | | | | |
|---|---|---|---|---|
| 4,137,598 A | * | 2/1979 | Sharp | 15/250.46 |
| 4,286,351 A | * | 9/1981 | Mower et al. | 15/250.46 |
| 5,073,060 A | * | 12/1991 | Pethers | 403/13 |
| 5,606,766 A | * | 3/1997 | Lee | 15/250.46 |
| 5,647,088 A | * | 7/1997 | Bommer et al. | 15/250.201 |
| 2005/0166349 A1 | * | 8/2005 | Nakano et al. | 15/250.201 |

FOREIGN PATENT DOCUMENTS

| | | | |
|---|---|---|---|
| GB | 2202899 | * | 10/1988 |
| GB | 2257027 | * | 1/1993 |

* cited by examiner

*Primary Examiner* — Gary Graham
(74) *Attorney, Agent, or Firm* — Banner & Witcoff, Ltd.

(57) ABSTRACT

A windshield wiper blade assembly comprises an elastic wiper blade and a linking mechanism including a pivot joint, a first arm, a second arm and a third arm secured to the wiper blade. The first, second and third arms are stacked one above another. The pivot joint has two opposite first pivot studs and two opposite second pivot studs. The first pivot studs are spaced apart from each other and protrude toward each other. The second pivot studs protrude away from each other. The pivot joint is disposed between the first and second arms. The first pivot studs extend into two side walls of the second arm, respectively, and the second pivot studs extend into the side walls of the first arm, respectively.

14 Claims, 10 Drawing Sheets

WINDSHIELD WIPER BLADE ASSEMBLY

CROSS-REFERENCE TO RELATED APPLICATION

This application claims priority of Chinese Application No. 201110007240.0, filed on Jan. 14, 2011.

BACKGROUND OF THE INVENTION

1. Field of the Invention

This invention relates to a windshield wiper blade assembly, more particular to a windshield wiper blade assembly including an elastic wiper blade and a linking mechanism having first and second arms pivoted to each other through a pivot joint that is formed with a pair of first pivot studs connected to the second arm and a pair of second pivot studs connected to the first arm.

2. Description of the Related Art

Conventional vehicle windshield wipers include an elongate elastic blade, an elongate blade support for supporting the elastic blade thereon, a connecting piece secured to the blade support, a wiper arm pivoted to the connecting piece, and a motor for driving movement of the wiper arm together with the blade.

There is a need to design a blade support that can uniformly distribute a force, applied by the wiper arm, to the elastic blade in a direction toward the windshield glass surface so that the entire elastic blade can be intimately attached to the windshield glass surface. In addition, the height of the blade support should be as low as possible so as to reduce the wind resistance thereof.

SUMMARY OF THE INVENTION

Therefore, an object of the present invention is to provide a windshield wiper blade assembly that can overcome the aforesaid drawbacks associated with the prior art.

According to the present invention, there is provided a windshield wiper blade assembly that comprises: an elastic wiper blade having a top end; and a linking mechanism including a pivot joint, a first arm having two opposite first side walls, a second arm having two opposite second side walls, and a third arm having two opposite ends secured to the top end of the wiper blade and a middle portion disposed between the ends of the third arm. The first, second and third arms are stacked one above another. The pivot joint has two opposite side walls, two opposite first pivot studs, and two opposite second pivot studs. Each of the side walls of the pivot joint has inner and outer faces. The first pivot studs are spaced apart from each other and protrude respectively from the inner faces of the side walls of the pivot joint toward each other along an axis. The second pivot studs protrude respectively from the outer faces of the side walls of the pivot joint away from each other along the axis. Each of the first side walls has a pivot end that is formed with an outer pivot hole. Each of the second side walls has a pivot end and a middle portion that is formed with an inner pivot hole. The middle portion of the third arm is disposed between and is pivoted to the pivot ends of the second side walls. The side walls of the pivot joint are disposed between the pivot ends of the first side walls. The middle portions of the second side walls are disposed between the side walls of the pivot joint. The first pivot studs extend into the inner pivot holes in the middle portions of the second side walls, respectively, and the second pivot studs extend into the outer pivot holes in the pivot ends of the first side walls, respectively, so as to permit the first side walls to be pivoted to the second side walls.

BRIEF DESCRIPTION OF THE DRAWINGS

In drawings which illustrate an embodiment of the invention.

DETAILED DESCRIPTION OF THE PREFERRED EMBODIMENT

Figure 1:
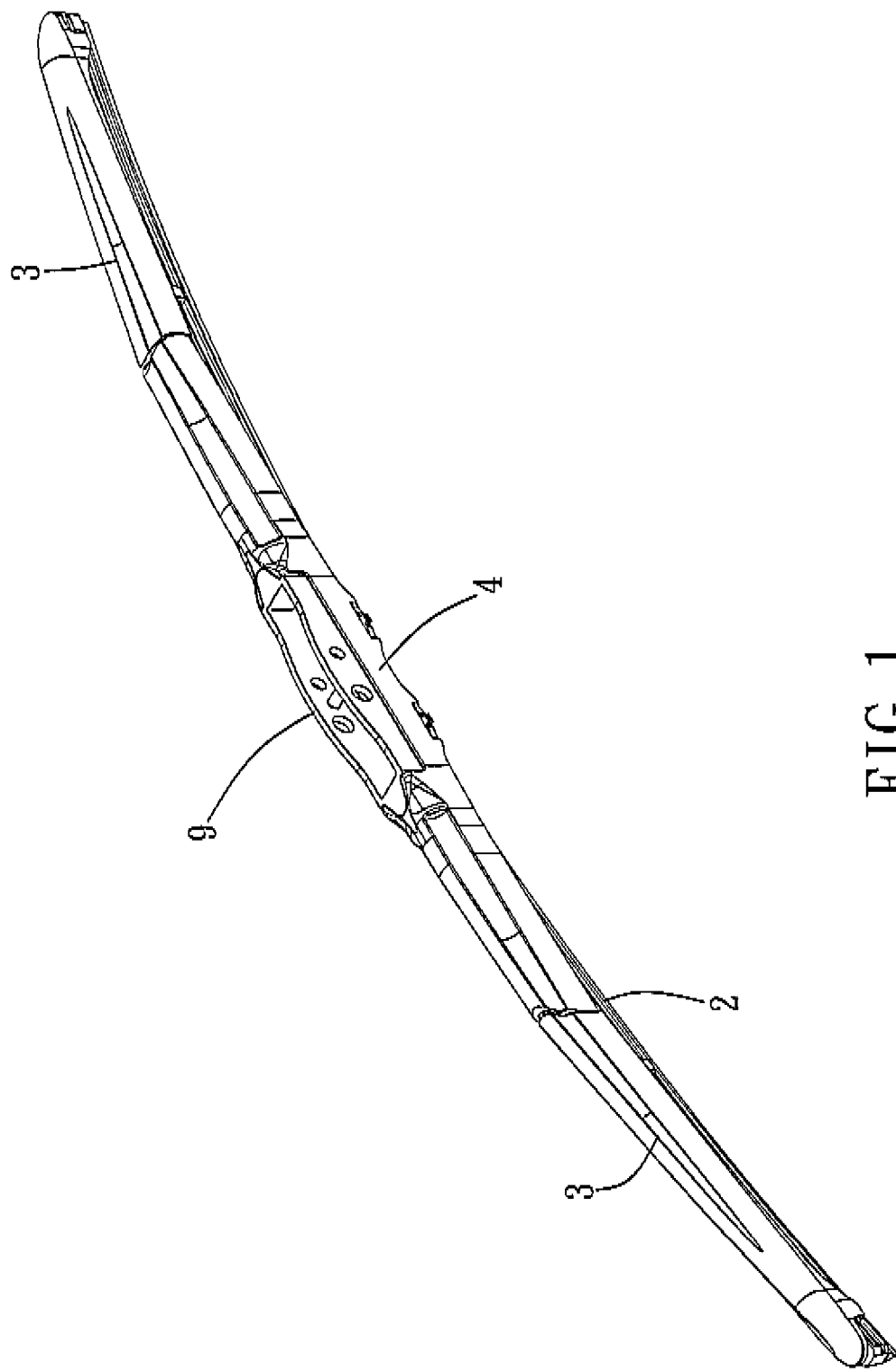
FIG. 1 is a perspective view of the preferred embodiment of a windshield wiper blade assembly according to the present invention, with a connecting piece mounted thereon.

FIGS. 1 to 4B illustrate the preferred embodiment of a windshield wiper blade assembly according to the present invention. The windshield wiper blade assembly is adapted to be connected to a wiper arm (not shown) through a connecting piece 9, and includes an elongate elastic wiper blade 2, two elongate side housings 3, an elongate middle housing 4, and a pair of linking mechanisms 5. The wiper arm together with the wiper blade assembly is driven by a wiper motor (not shown) so as to permit the wiper blade 2 to wipe a windshield glass surface (not shown).

Each of the linking mechanisms 5 includes a pivot joint 54, a first arm 51 having a generally U-shaped cross section and two opposite first side walls 511, a second arm 52 having a generally U-shaped cross section and two opposite second side walls 521, and a third arm 53 having two opposite ends 531 secured to a top end 20 of the wiper blade 2 and a middle portion 532 disposed between the ends 531 of the third arm 53. The first, second and third arms 51, 52, 53 are stacked one above another. Each of the opposite ends 531 of the third arm 53 is provided with a C-shaped clamper 535 that clamps the top end 20 of the elastic wiper blade 2.

The pivot joint 54 has two opposite side walls 541, two opposite first pivot studs 542, and two opposite second pivot studs 543. Each of the side walls 541 of the pivot joint 54 has inner and outer faces 5411, 5412. The first pivot studs 542 are spaced apart from each other and protrude respectively from the inner faces 5411 of the side walls 541 of the pivot joint 54 toward each other along an axis (X). The second pivot studs 543 protrude respectively from the outer faces 5412 of the side walls 541 of the pivot joint away from each other along the axis (X).

Each of the first side walls 511 of the first arm 51 has a pivot end 5111 that is formed with an outer pivot hole 5112. Each of the second side walls 521 of the second arm 52 has a pivot end 5211 and a middle portion 5212 that is formed with an inner pivot hole 5213. The middle portion 532 of the third arm 53 is disposed between and is pivoted to the pivot ends 5211 of the second side walls 521. A pivot pin 8 extends through pivot holes 5214 in the pivot ends 5211 of the second side walls 521 and a pivot hole 5324 in the middle portion 532 of the third arm 53.

The side walls 541 of the pivot joint 54 are disposed between the pivot ends 5111 of the first side walls 511. The middle portions 5212 of the second side walls 521 are disposed between the side walls 541 of the pivot joint 54. The first pivot studs 542 extend into the inner pivot holes 5213 in the middle portions 5212 of the second side walls 521, respectively, and the second pivot studs 543 extend into the outer pivot holes 5112 in the pivot ends 5111 of the first side walls 511, respectively, so as to permit the first side walls 511 of the first arm 51 to be pivoted to the second side walls 521 of the second arm 52 and to be rotatable relative to the second arm 52 about the axis (X).

The first arm 51 defines an inner space 510. The second arm 52 defines an inner space 520. Each of the second side walls 521 has a segment 5215 that extends from the middle portion 5212 to the pivot end 5211 of the second side wall 521 and that is substantially received in the inner space 510 in the first arm 51. The third arm 53 has two halves 533, each of which extends from the middle portion 532 to a respective one of the ends 531 of the third arm 53. One of the halves 533 has a portion substantially received in the inner space 520 in the second arm 52 and a remaining portion partially received in the inner space 510 in the first arm 51. As such, arrangement of the first, second and third arms 51, 52, 53 permits uniform distribution of a force, applied by the wiper arm, to the elastic blade 2 in a direction toward the windshield glass surface so that the entire elastic blade 2 can be intimately attached to the windshield glass surface (not shown), and further permits reduction of the overall height of the assembly of the first, second and third arms 51, 52, 53 so as to reduce the wind resistance thereof.

In this embodiment, the outer face 5412 of each of the side walls 541 of the pivot joint 54 is substantially perpendicular to the axis (X). Each of the second pivot studs 543 has an inclined guiding face 5431 that is inclined relative to the outer face 5412 of a respective one of the side walls 541 of the pivot joint 54 so as to permit the second pivot studs 543 to pass through the pivot ends 5111 of the first side walls 511 and into the inner space 510 in the first arm 51.

Figure 2:
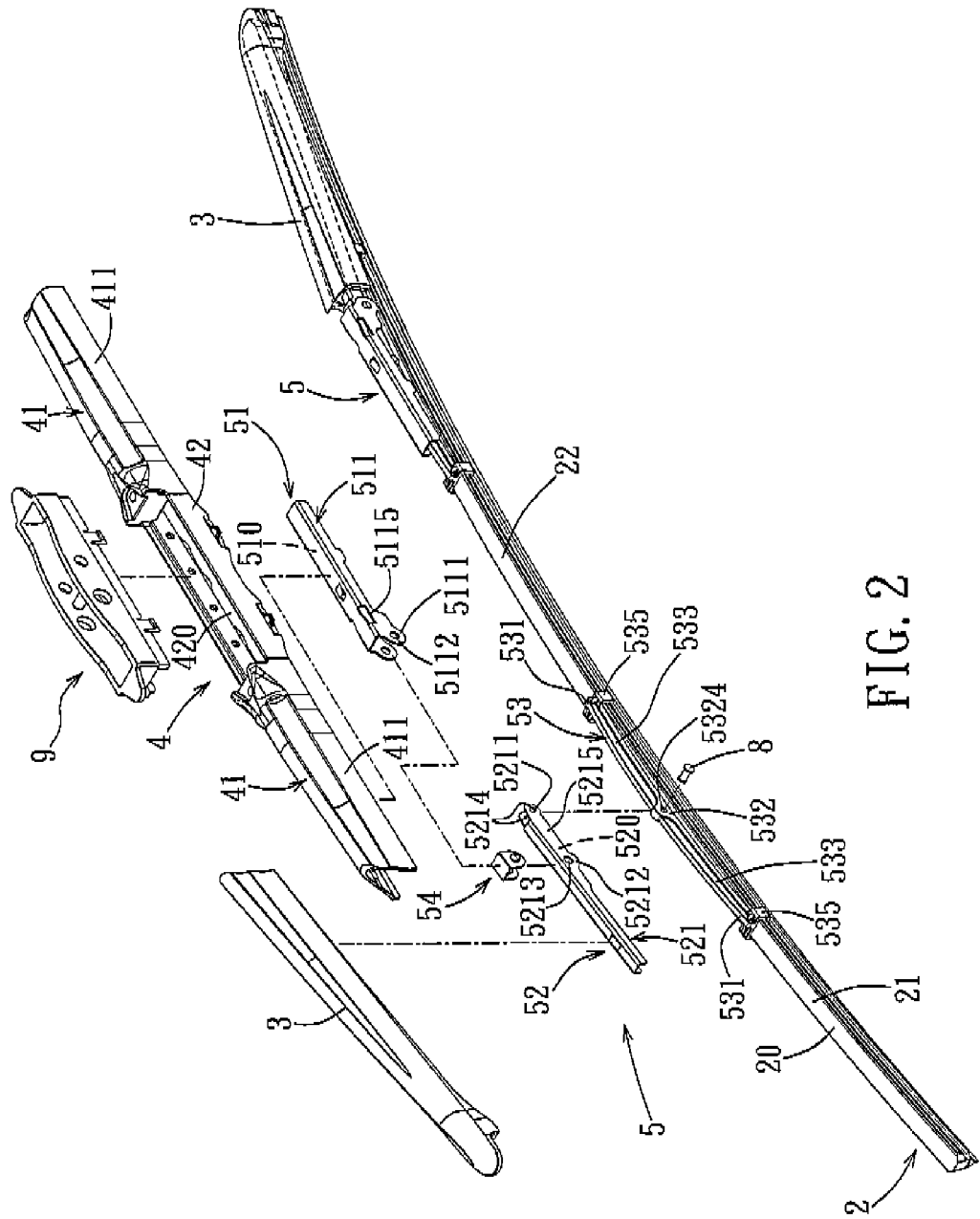
FIG. 2 is a partly exploded perspective view of the preferred embodiment.
Figure 3:
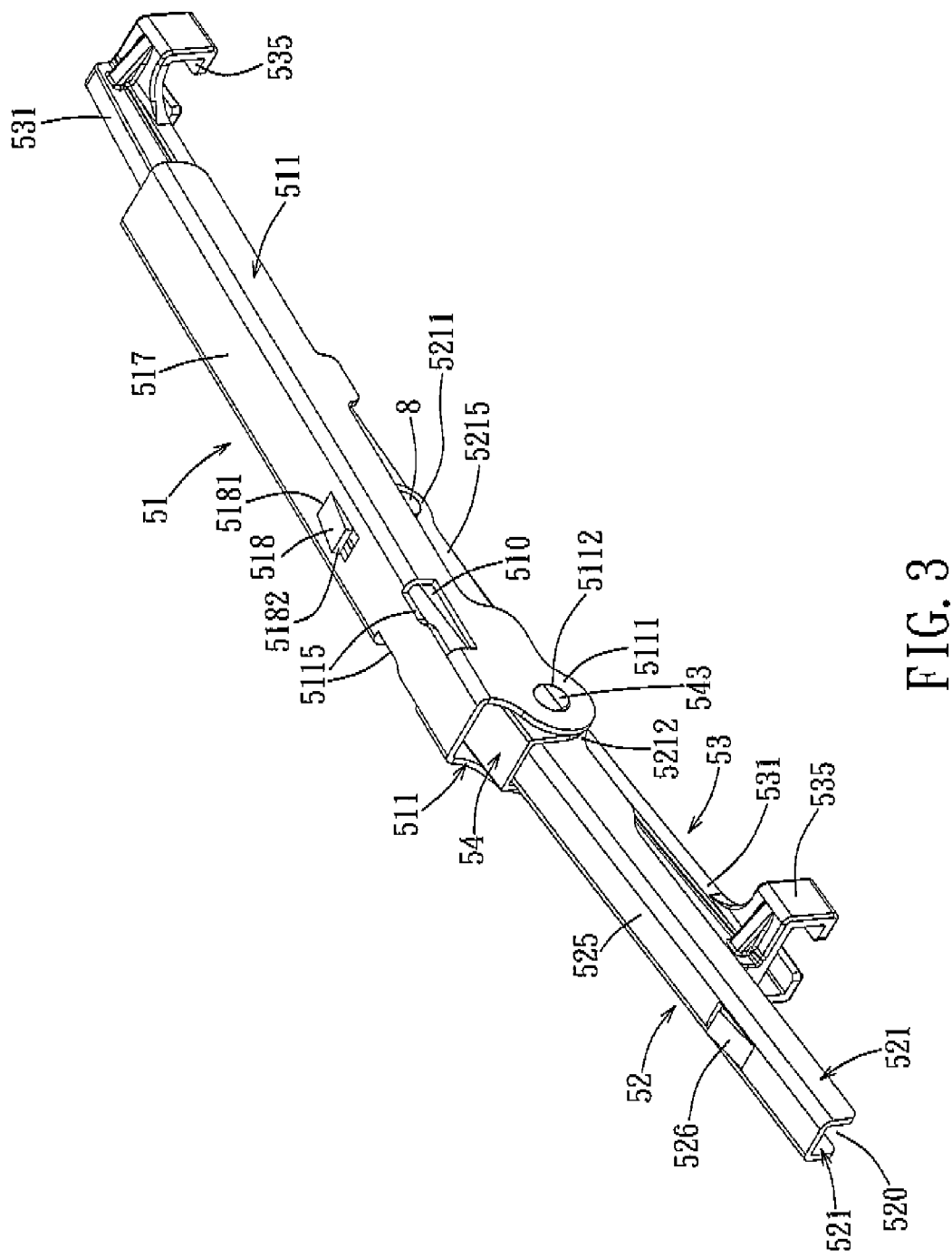
FIG. 3 is an assembled perspective view of a linking mechanism of the preferred embodiment.
Figure 4A:
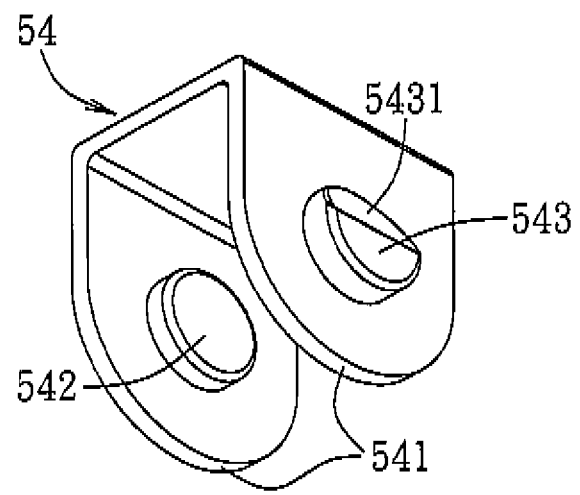
FIG. 4A is a perspective view of a pivot joint of the linking mechanism of the preferred embodiment.
Figure 4B:
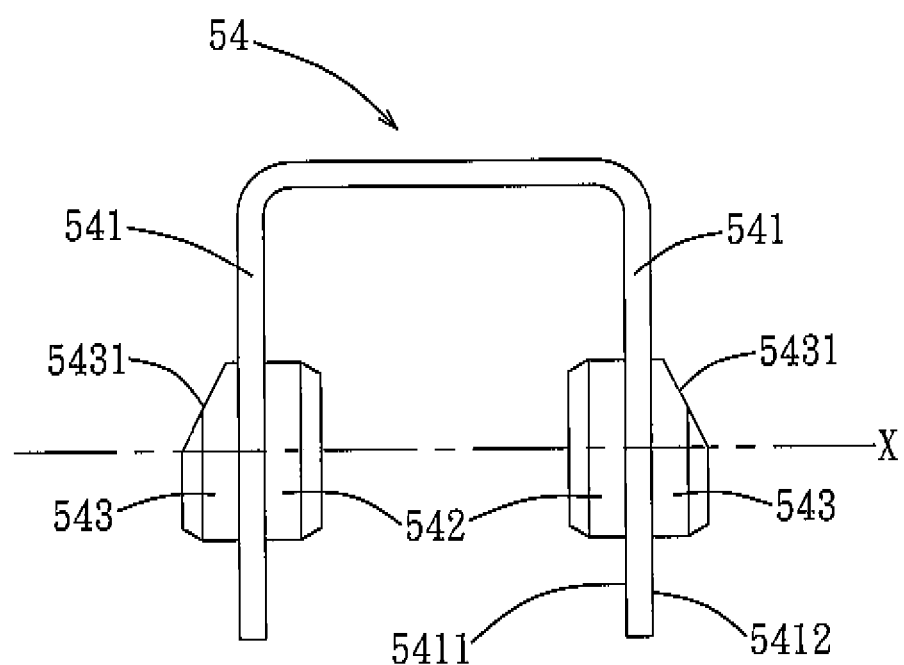
FIG. 4B is a side view of the pivot joint of the linking mechanism of the preferred embodiment.
Figure 5:
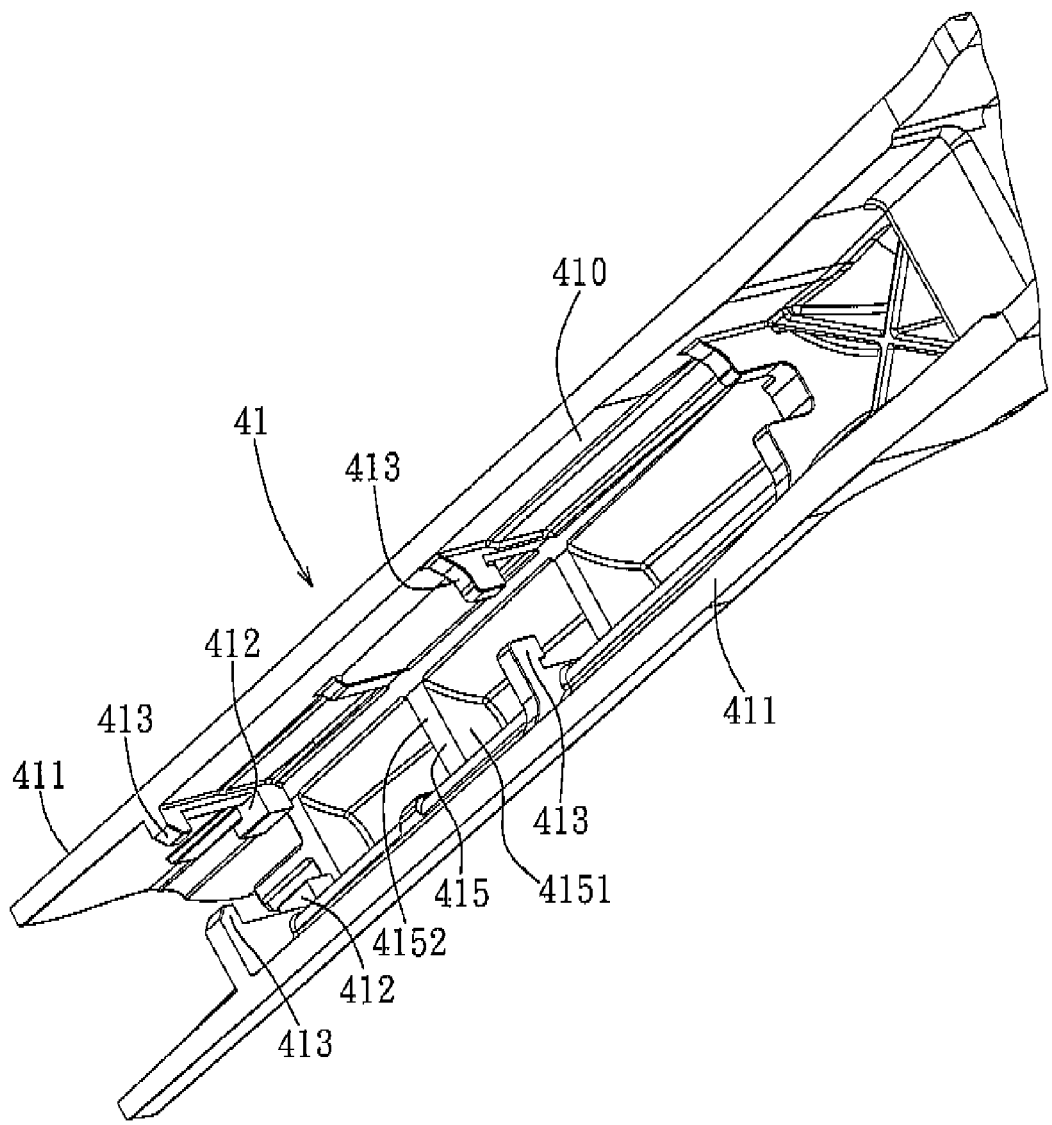
FIG. 5 is a fragmentary bottom perspective view of the preferred embodiment illustrating an inner structure of a middle housing.
Figure 6A:
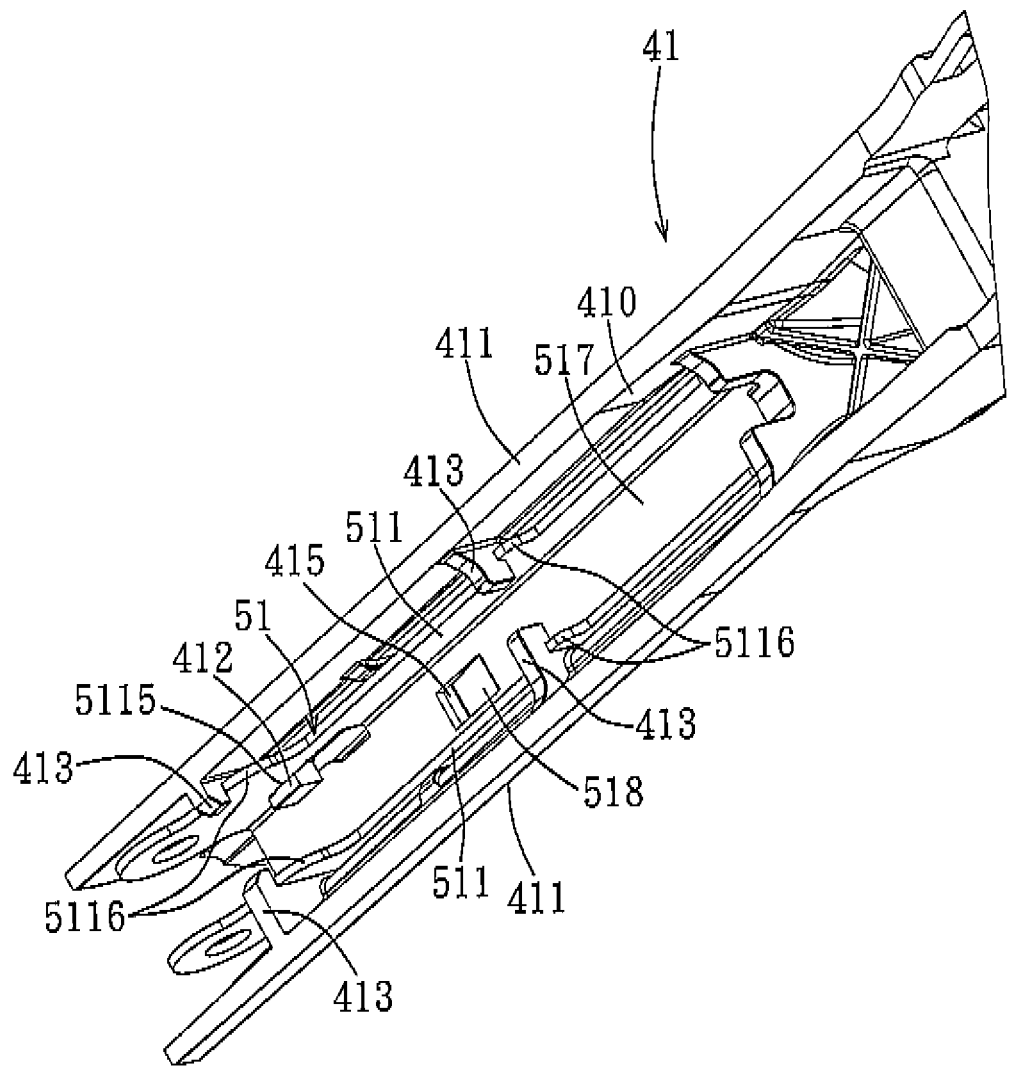
FIG. 6A is a fragmentary bottom perspective view of the preferred embodiment illustrating the connection between a first arm and the middle housing.
Figure 6B:
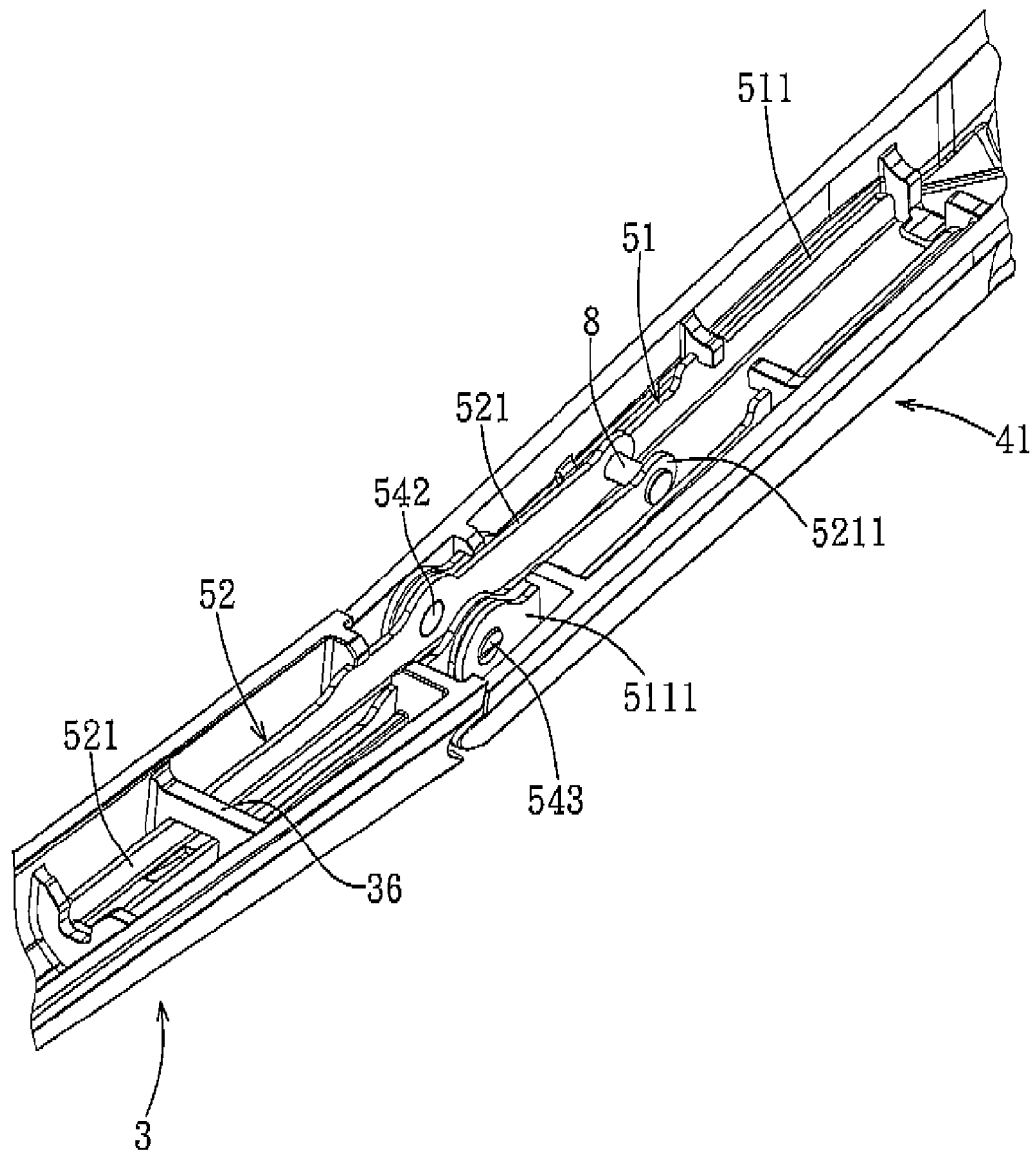
FIG. 6B is a fragmentary bottom perspective view of the preferred embodiment illustrating the connection among the first arm, a second arm and the middle housing.

Referring to FIGS. 5 to 6B, in combination with FIGS. 1 to 3, the middle housing 4 covers a middle portion 22 of the wiper blade 2 and has two end portions 41. Each of the end portions 41 has an inverted U-shaped cross section, defines an inner space 410 therein, and has two opposite side walls 411, each of which is formed with an engaging tongue 412 protruding into the inner space 410. Each of the first side walls 511 of the first arm 51 is formed with an engaging hole 5115 (see FIG. 3). The first side walls 511 of the first arm 51 of each of the linking mechanism 5 are received in the inner space 410 in a respective one of the end portions 41 of the middle housing 4 and are disposed between the side walls 411 of the respective one of the end portions 41. The engaging tongues 412 of the side walls 411 extend toward each other into the engaging holes 5115 in the first side walls 511, respectively.

Each of the side walls 411 of each of the end portions 41 of the middle housing 4 has a bottom end that is formed with two spaced apart limiting projections 413 (see FIGS. 5 and 6A). Each of the first side walls 511 of the first arm 51 has a bottom end that is formed with two spaced apart limiting protrusions 5116 (see FIG. 6A). The limiting projections 413 of the bottom ends of the side walls 411 of each of the end portions 41 of the middle housing 4 crisscross and abut against the limiting protrusions 5116 of the bottom ends of the first side walls 511, respectively.

The middle housing 4 further has a limiting wall 415 disposed in the inner space 410 between the side walls 411 of each of the end portions 41 of the middle housing 4. The first arm 51 further has a top wall 517 (see FIG. 3) interconnecting the first side walls 511. The top wall 517 is punched and pressed to form a flexible tab 518 bent therefrom. The flexible tab 518 has a connecting end 5181 extending from the top wall 517, and a raised end 5182 opposite to the connecting end 5181 and abutting against a side surface 4151 of the limiting wall 415. During assembly of one of the first arms 51 to the middle housing 4 and when the one of the first arms 51 is inserted into the inner space 410 in the corresponding end portion 41 of the middle housing 4, the raised end 5182 of the flexible tab 518 slides on and is pushed by a bottom end edge 4152 of the limiting wall 415 to align with the corresponding top wall 517 until the entire flexible tab 518 passes past the bottom end edge 4152 of the limiting wall 415. When the flexible tab 518 is moved past the bottom end edge 4152 of the limiting wall 415, due to the return force of the flexible tab 518, the flexible tab 518 restores its original shape so that the raised end 5182 of the flexible tab 518 abuts against the side surface 4151 of the limiting wall 415, the limiting protrusions 5116 of the one of the first arms 51 respectively crisscross and come into contact with the limiting projections 413 of the corresponding end portion 41 of the middle housing 4, and the engaging holes 5115 in the one of the first arms 51 engage respectively the engaging tongues 412 of the corresponding end portion 41 of the middle housing 4. As a result, movement of the one of the first arms 51 relative to the middle housing 4 can be prevented.

Referring to FIG. 2, the middle housing 4 further has a middle portion 42 that defines a central recess 420 for receiving the connecting piece 9 therein.

Figure 7:
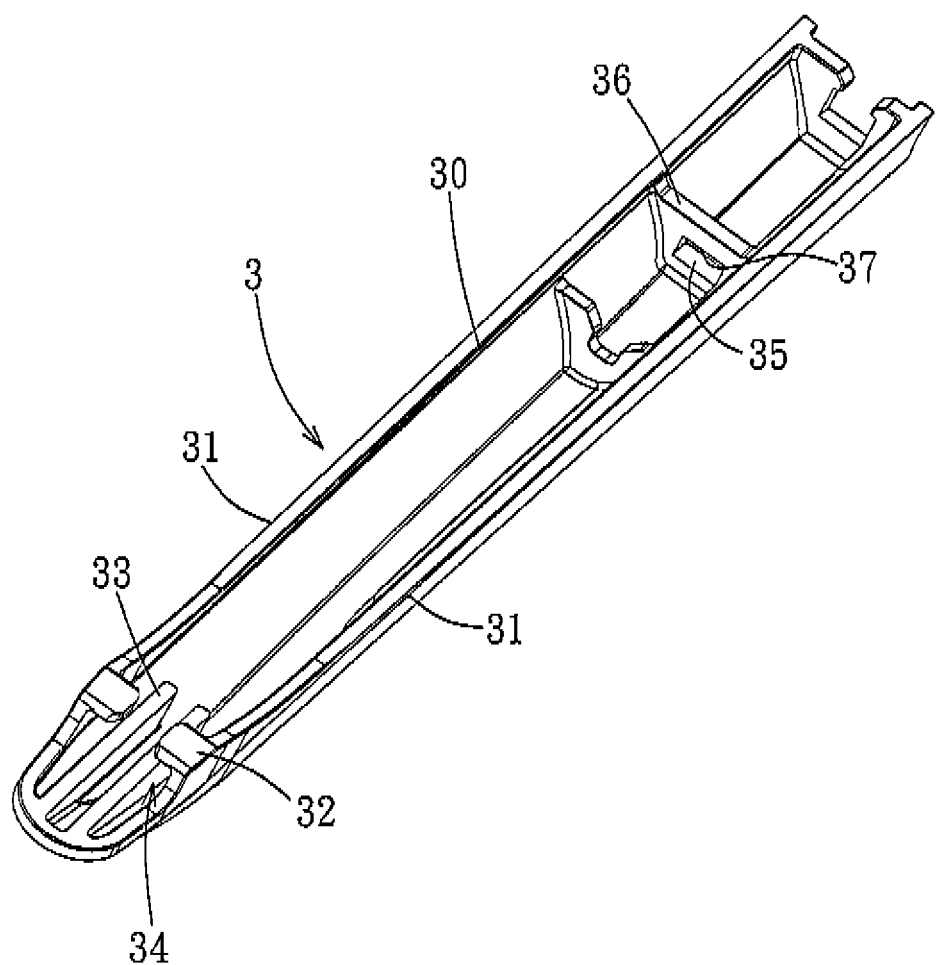
FIG. 7 is a fragmentary bottom perspective view illustrating an inner structure of a side housing of the preferred embodiment.
Figure 8:
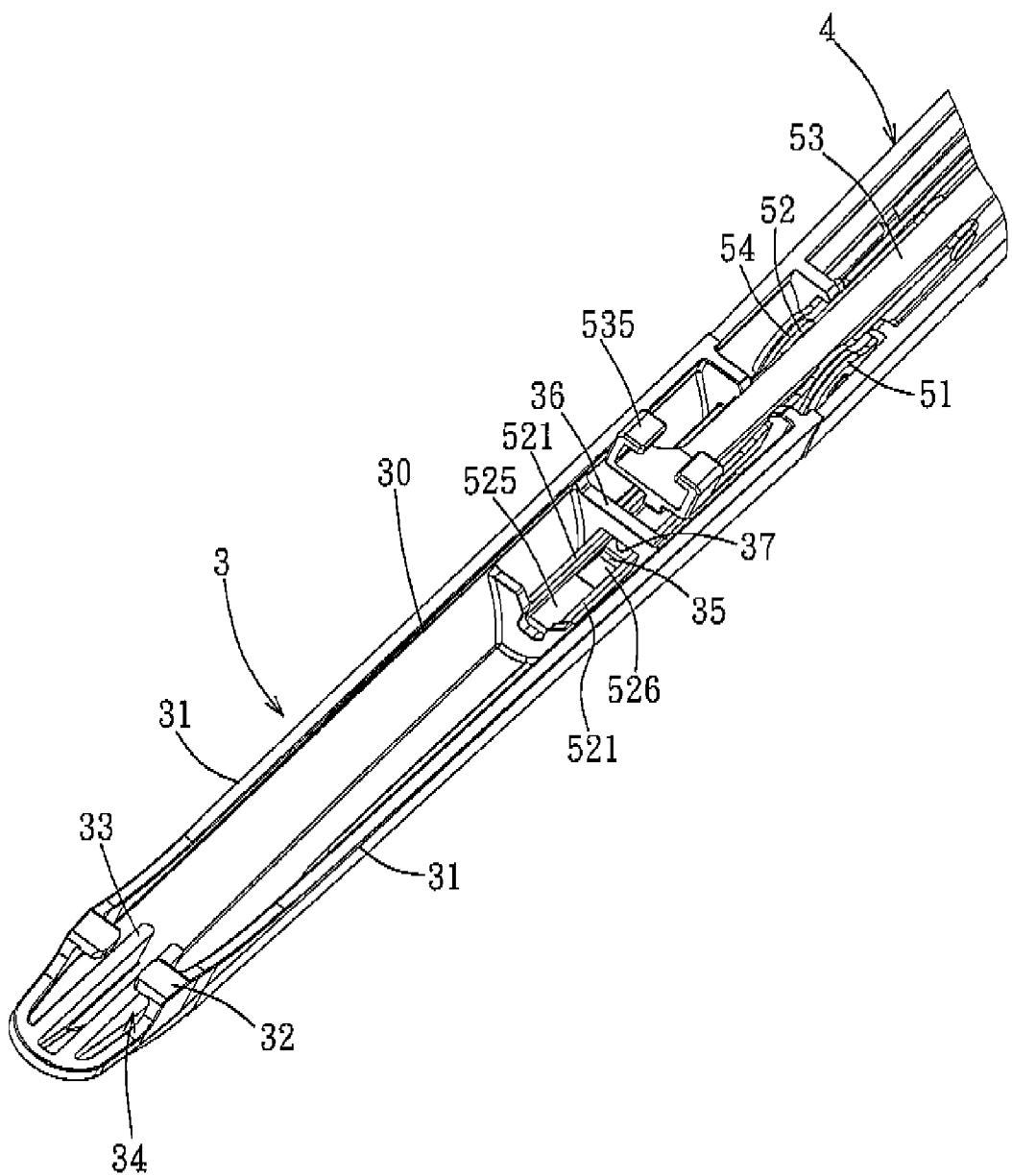
FIG. 8 is a fragmentary bottom perspective view of the preferred embodiment illustrating the connection among first and second arms, the side housing and the middle housing.
Figure 9:
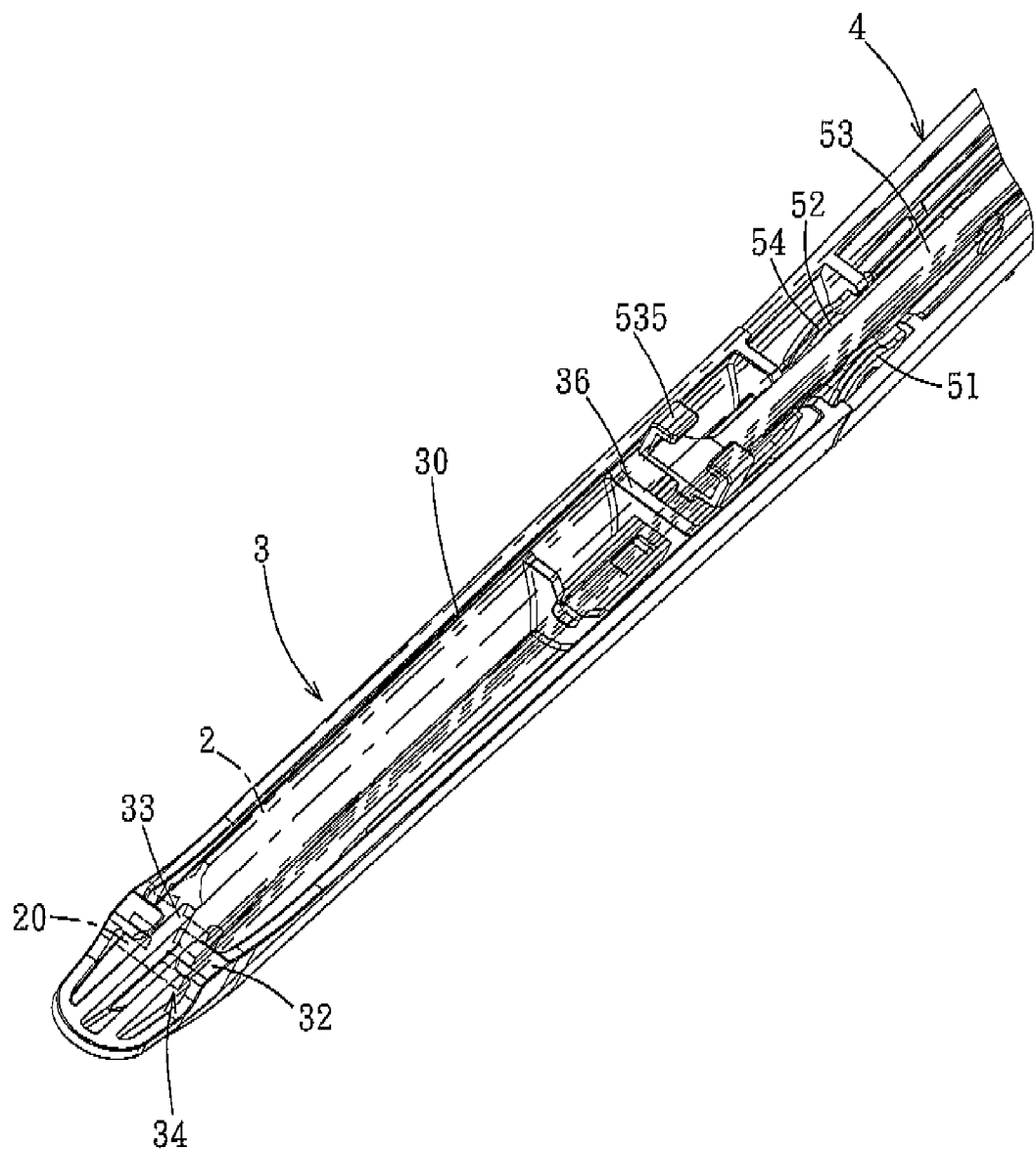
FIG. 9 is a fragmentary bottom perspective view of the preferred embodiment illustrating the connection among an elastic wiper blade, the first and second arms, the side housing and the middle housing.

Referring to FIGS. 7 to 9, in combination with FIGS. 1 and 2, each of the side housings 3 has an inverted U-shaped cross section and covers a portion 21 of the top end 20 of the wiper blade 2. Each of the side housings 3 defines an inner space 30 therein and has two opposite side walls 31, each of which has a bottom end. The bottom end of each of the side walls 31 of each of the side housings 3 is formed with first and second clamping means 32, 33 that are disposed one above the other to cooperatively define a clamping gap 34 therebetween. The first clamping means 32 is disposed outwardly of the inner space 30 in the corresponding side housing 3. The second clamping means 33 extends into the inner space 30 in the corresponding side housing 3. The top end 20 of the wiper blade 2 extends through the clamping gap 34 and is clamped between the first and second clamping means 32, 33.

Each of the side housings 3 further has an upper bar 35 disposed between the side walls 31 in the inner space 30, and a lower bar 36 disposed below the upper bar 35 and interconnecting the side walls 31. The upper and lower bars 35, 36 cooperatively defining a limiting gap 37 therebetween. The second arm 52 extends through the limiting gap 37 and between the upper and lower bars 35, 36.

The second arm 52 of each of the liking mechanisms 5 further has a top wall 525 interconnecting the second side walls 521. The top wall 525 of the second arm 52 is punched and pressed to form a flexible tab 526 bent therefrom. The flexible tab 526 of the top wall 525 of the second arm 52 is connected to the upper bar 35 of the side housing 3 in a snap-fit engaging manner (see FIG. 8) similar to the manner in which the flexible tab 518 is connected to the limiting wall 415.

With the invention thus explained, it is apparent that various modifications and variations can be made without departing from the spirit of the present invention.

What is claimed is:

1. A windshield wiper blade assembly, comprising:
   an elastic wiper blade having a top end;
   a linking mechanism including a pivot joint, a first arm having two opposite first side walls, a second arm having two opposite second side walls, and a third arm having two opposite ends secured to said top end of said wiper blade and a middle portion disposed between said ends of said third arm, said first, second and third arms being stacked one above another, said pivot joint having two opposite side walls, two opposite first pivot studs, and two opposite second pivot studs, each of said side walls of said pivot joint having inner and outer faces, said first pivot studs being spaced apart from each other and protruding respectively from said inner faces of said side walls of said pivot joint toward each other along an axis, said second pivot studs protruding respectively from said outer faces of said side walls of said pivot joint away from each other along the axis, each of said first side walls having a pivot end that is formed with an outer pivot hole, each of said second side walls having a pivot end and a middle portion that is formed with an inner pivot hole, said middle portion of said third arm being disposed between and pivoted to said pivot ends of said second side walls, said side walls of said pivot joint being disposed between said pivot ends of said first side walls, said middle portions of said second side walls being disposed between said side walls of said pivot joint, said first pivot studs extending into said inner pivot holes in said middle portions of said second side walls, respectively, and said second pivot studs extending into said outer pivot holes in said pivot ends of said first side walls, respectively, so as to permit said first side walls to be pivoted to said second side walls; and
   a middle housing covering a middle portion of said wiper blade, said middle housing having a portion that has an inverted U-shaped cross section, that defines an inner space therein, and that further has two opposite side walls and a limiting wall disposed in said inner space in said middle housing between said side walls of said middle housing and having a side surface, said first arm further having a top wall interconnecting said first side walls, said top wall being punched and pressed to form a flexible tab bent therefrom, said flexible tab having a connecting end extending from said top wall, and a raised end opposite to said connecting end and abutting against said limiting wall in a snap-fit engaging manner.

2. The windshield wiper blade assembly of claim 1, wherein said outer face of each of said side walls of said pivot joint is substantially perpendicular to the axis, each of said second pivot studs having an inclined guiding face that is inclined to said outer face of a respective one of said side walls of said pivot joint.

3. The windshield wiper blade assembly of claim 1, further comprising a middle housing covering a middle portion of said wiper blade, said middle housing having a portion that has an inverted U-shaped cross section, that defines an inner space therein, and that further has two opposite side walls, each of which is formed with an engaging tongue protruding into said inner space in said middle housing, each of said first side walls being formed with an engaging hole, said first side walls being received in said inner space in said middle housing and being disposed between said side walls of said middle housing, said engaging tongues of said side walls of said portion of said middle housing extending toward each other into said engaging holes in said first side walls, respectively.

4. The windshield wiper blade assembly of claim 1, further comprising a middle housing covering a middle portion of said wiper blade, said middle housing having a portion that has an inverted U-shaped cross section, that defines an inner space therein, and that further has two opposite side walls, each of which has a bottom end that is formed with a limiting projection, each of said first side walls having a bottom end that is formed with a limiting protrusion, said limiting projections of said bottom ends of said side walls of said portion of said middle housing abutting against said limiting protrusions of said bottom ends of said first side walls, respectively.

5. The windshield wiper blade assembly of claim 1, further comprising a side housing having an inverted U-shaped cross section and covering a portion of said top end of said wiper blade, said side housing defining an inner space therein and having two opposite side walls, each of which has a bottom end, said bottom ends of said side walls of said side housing being formed with first and second clamping means that are disposed one above the other to cooperatively define a clamping gap therebetween, said first clamping means being disposed outwardly of said inner space in said side housing, said second clamping means extending into said inner space in said side housing, said top end of said wiper blade extending through said clamping gap and being clamped between said first and second clamping means.

6. The windshield wiper blade assembly of claim 1, further comprising a side housing having an inverted U-shaped cross section and covering a portion of said top end of said wiper blade, said side housing defining an inner space therein and having two opposite side walls, an upper bar disposed between said side walls of said side housing in said inner space in said side housing, and a lower bar disposed below said upper bar and interconnecting said side walls of said side housing, said upper and lower bars cooperatively defining a limiting gap therebetween, said second arm extending through said limiting gap and between said upper and lower bars.

7. The windshield wiper blade assembly of claim 6, wherein said second arm further has a top wall interconnecting said second side walls, said top wall being punched and pressed to form a flexible tab bent therefrom, said flexible tab having a connecting end extending from said top wall, and a raised end opposite to said connecting end and abutting against said upper bar in a snap-fit engaging manner.

8. A windshield wiper blade assembly, comprising:
   an elastic wiper blade having a top end;
   a linking mechanism including a pivot joint, a first arm having two opposite first side walls, a second arm having two opposite second side walls, and a third arm having two opposite ends secured to said top end of said wiper blade and a middle portion disposed between said ends of said third arm, said first, second and third arms being stacked one above another, said pivot joint having two opposite side walls, two opposite first pivot studs, and two opposite second pivot studs, each of said side walls of said pivot joint having inner and outer faces, said first pivot studs being spaced apart from each other and protruding respectively from said inner faces of said side walls of said pivot joint toward each other along an axis, said second pivot studs protruding respectively from said outer faces of said side walls of said pivot joint away from each other along the axis, each of said first side walls having a pivot end that is formed with an outer pivot hole, each of said second side walls having a pivot end and a middle portion that is formed with an inner pivot hole, said middle portion of said third arm being disposed between and pivoted to said pivot ends of said second side walls, said side walls of said pivot joint being disposed between said pivot ends of said first side walls, said middle portions of said second side walls being disposed between said side walls of said pivot joint, said first pivot studs extending into said inner pivot holes in said middle portions of said second side walls, respectively, and said second pivot studs extending into said outer pivot holes in said pivot ends of said first side walls, respectively, so as to permit said first side walls to be pivoted to said second side walls; and a side housing having an inverted U-shaped cross section and covering a portion of said top end of said wiper blade, said side housing defining an inner space therein and having two opposite side walls, an upper bar disposed between said side walls of said side housing in said inner space in said side housing, and a lower bar disposed below said upper bar and interconnecting said side walls of said side housing, said upper and lower bars cooperatively defining a limiting gap therebetween, said second arm extending through said limiting gap and between said upper and lower bars.

9. The windshield wiper blade assembly of claim 8, wherein said outer face of each of said side walls of said pivot joint is substantially perpendicular to the axis, each of said second pivot studs having an inclined guiding face that is inclined to said outer face of a respective one of said side walls of said pivot joint.

10. The windshield wiper blade assembly of claim 8, further comprising a middle housing covering a middle portion of said wiper blade, said middle housing having a portion that has an inverted U-shaped cross section, that defines an inner space therein, and that further has two opposite side walls, each of which is formed with an engaging tongue protruding into said inner space in said middle housing, each of said first side walls being formed with an engaging hole, said first side walls being received in said inner space in said middle housing and being disposed between said side walls of said middle housing, said engaging tongues of said side walls of said portion of said middle housing extending toward each other into said engaging holes in said first side walls, respectively.

11. The windshield wiper blade assembly of claim 8, further comprising a middle housing covering a middle portion of said wiper blade, said middle housing having a portion that has an inverted U-shaped cross section, that defines an inner space therein, and that further has two opposite side walls, each of which has a bottom end that is formed with a limiting projection, each of said first side walls having a bottom end that is formed with a limiting protrusion, said limiting projections of said bottom ends of said side walls of said portion of said middle housing abutting against said limiting protrusions of said bottom ends of said first side walls, respectively.

12. The windshield wiper blade assembly of claim 8, further comprising a middle housing covering a middle portion of said wiper blade, said middle housing having a portion that has an inverted U-shaped cross section, that defines an inner space therein, and that further has two opposite side walls and a limiting wall disposed in said inner space in said middle housing between said side walls of said middle housing and having a side surface, said first arm further having a top wall interconnecting said first side walls, said top wall being punched and pressed to form a flexible tab bent therefrom, said flexible tab having a connecting end extending from said top wall, and a raised end opposite to said connecting end and abutting against said limiting wall in a snap-fit engaging manner.

13. The windshield wiper blade assembly of claim 8, further comprising a side housing having an inverted U-shaped cross section and covering a portion of said top end of said wiper blade, said side housing defining an inner space therein and having two opposite side walls, each of which has a bottom end, said bottom ends of said side walls of said side housing being formed with first and second clamping means that are disposed one above the other to cooperatively define a clamping gap therebetween, said first clamping means being disposed outwardly of said inner space in said side housing, said second clamping means extending into said inner space in said side housing, said top end of said wiper blade extending through said clamping gap and being clamped between said first and second clamping means.

14. The windshield wiper blade assembly of claim 8, wherein said second arm further has a top wall interconnecting said second side walls, said top wall being punched and pressed to form a flexible tab bent therefrom, said flexible tab having a connecting end extending from said top wall, and a raised end opposite to said connecting end and abutting against said upper bar in snap-fit engaging manner.

* * * * *